US011216390B2

(12) United States Patent
Motoyama et al.

(10) Patent No.: US 11,216,390 B2
(45) Date of Patent: Jan. 4, 2022

(54) STORAGE DEVICE, MEMORY ACCESS CONTROL SYSTEM, AND MEMORY ACCESS CONTROL METHOD (71) Applicant: KIOXIA CORPORATION, Tokyo (JP)

(72) Inventors: Masahiko Motoyama, Oyama Tochigi (JP); Kentaro Umesawa, Kawasaki Kanagawa (JP); Shintaro Haba, Kawasaki Kanagawa (JP)

(73) Assignee: Kioxia Corporation, Tokyo (JP)

( * ) Notice: Subject to any disclaimer, the term of this patent is extended or adjusted under 35 U.S.C. 154(b) by 31 days.

(21) Appl. No.: 16/802,054

(22) Filed: Feb. 26, 2020

(65) Prior Publication Data
US 2021/0026787 A1 Jan. 28, 2021

(30) Foreign Application Priority Data

Jul. 25, 2019 (JP) .............................. JP2019-137091

(51) Int. Cl.
*G06F 12/14* (2006.01)
(52) U.S. Cl.
CPC ...... *G06F 12/1483* (2013.01); *G06F 12/1441* (2013.01)
(58) Field of Classification Search
CPC ............. G06F 12/1441; G06F 12/1483; G06F 2212/1052; G06F 12/14
See application file for complete search history.

(56) References Cited

U.S. PATENT DOCUMENTS 6,021,476 A    2/2000 Segars
7,216,183 B2 * 5/2007 Ho ...................... G06F 13/4027
                                                710/306
7,757,101 B2    7/2010 Nonaka et al.
8,713,563 B2    4/2014 Kondoh et al.
2004/0236889 A1 * 11/2004 Kim ...................... G06F 13/364
                                                710/113

(Continued)

FOREIGN PATENT DOCUMENTS

JP          3710490 B2    10/2005
JP     2007-109053 A       4/2007
JP          4469783 B2     5/2010

OTHER PUBLICATIONS

P. Poorani and B. M. E. Vijayashree, "Implementation of AHB bus protocol for system on chip security," 2015 2nd International Conference on Electronics and Communication Systems (ICECS), 2015, pp. 1407-1413.*

*Primary Examiner* — Pierre Miche Bataille
(74) *Attorney, Agent, or Firm* — Foley & Lardner LLP (57) ABSTRACT

A storage device includes a storage and a controller. The controller can control data write to the storage and data read from the storage. The controller includes a first processor, a second processor, a first bus, a memory access control device, and a second bus. The memory access control device can manage a memory access control information table. The memory access control information table stores access control information indicating a range of each of areas of the memory and an identifier associated with each area. The memory access control device can compare the identifier output to the first bus with the identifier in the memory access control information table, and determine whether to allow the access to the memory requested by the second processor.

9 Claims, 5 Drawing Sheets

(56) References Cited

U.S. PATENT DOCUMENTS

| | | | |
|---|---|---|---|
| 2004/0250003 A1* | 12/2004 | Chang | G06F 13/362 |
| | | | 710/107 |
| 2007/0124557 A1 | 5/2007 | Kanai | |
| 2007/0255872 A1* | 11/2007 | Tawara | G06F 13/404 |
| | | | 710/110 |
| 2010/0312935 A1* | 12/2010 | Higuchi | G06F 13/374 |
| | | | 710/112 |
| 2011/0191562 A1 | 8/2011 | Chou et al. | |
| 2018/0039544 A1* | 2/2018 | Scobie | G06F 11/2043 |
| 2019/0391942 A1* | 12/2019 | Hayakawa | H04L 12/403 |

* cited by examiner

STORAGE DEVICE, MEMORY ACCESS CONTROL SYSTEM, AND MEMORY ACCESS CONTROL METHOD

CROSS-REFERENCE TO RELATED APPLICATION

This application is based upon and claims the benefit of priority from Japanese Patent Application No. 2019-137091, filed Jul. 25, 2019, the entire contents of which are incorporated herein by reference.

FIELD

Embodiments described herein relate generally to a storage device, a memory access control system, and a memory access control method.

BACKGROUND

In recent years, various storage devices such as a hard disk drive (HDD) and a solid state drive (SSD) are widely used. In this type of the storage device, for example, a controller configured with an SoC (System On a Chip) controls data write to a storage, data read from the storage, or the like.

The SoC constituting the controller usually includes a processor and a memory which the processor uses as a cache or a work area. The memory may be provided outside the SoC. Further, a plurality of the processors may be included. In addition, a bus for coupling the processor and the memory is included in the SoC. When the plurality of processors are included, each of the plurality of processors accessing the memory via the bus operates as a bus master.

In an environment in which a plurality of the bus masters access the memory, it may be necessary to control access to the memory for each bus master. For example, there is a need for measures to prevent data written by one bus master on the memory from being illegally read or rewritten by other bus masters.

Examples of related art include JP-A-2007-109053, JP-A-2008-97173, US Patent Application Publication No. 2011/191562, and JP-A-2001-175606.

DETAILED DESCRIPTION

A method is known which manages information indicating whether each of a plurality of bus masters can access each area on a memory, or the like, and controls access to the memory for each bus master based on the management information. In such a method, it is necessary to prevent unauthorized rewrite of the management information.

Embodiments provide a storage device, a memory access control system, and a memory access control method which can prevent unauthorized rewrite of management information in order to restrict access to memory for each bus master.

In general, according to one embodiment, a storage device includes a storage and a controller. The controller is configured to control data write to the storage and data read from the storage. The controller includes a first processor, a second processor, a first bus, a memory access control device, and a second bus. The first bus is configured for the second processor to access a memory that is configured for use by the second processor as a cache or a work area. The memory access control device is configured to manage a memory access control information table. The memory access control information table stores access control information including information indicating a range of each of a plurality of areas of the memory and an identifier associated with each area. The memory access control device is configured to control, on the basis of the memory access control information table, access to the memory by the second processor using the first bus. The second bus is configured for the first processor to access the second processor and the memory access control device. The first processor has a first security strength higher than a second security strength of the second processor. The first processor is configured to set the memory access control information table via the second bus, and set an identifier to the second processor, the set identifier being among the identifiers stored in the memory access control information table and corresponding to a range of an area of the memory to which the second processor is permitted to access. The second processor is configured to output the identifier to the first bus together with control information requesting access to the memory when accessing the memory. The memory access control device is configured to compare the identifier output to the first bus with the identifier stored in the memory access control information table, and determine whether to allow the access to the memory requested by the second processor.

Hereinafter, embodiments will be described with reference to the drawings.

First Embodiment

First, a first embodiment will be described.

Figure 1:
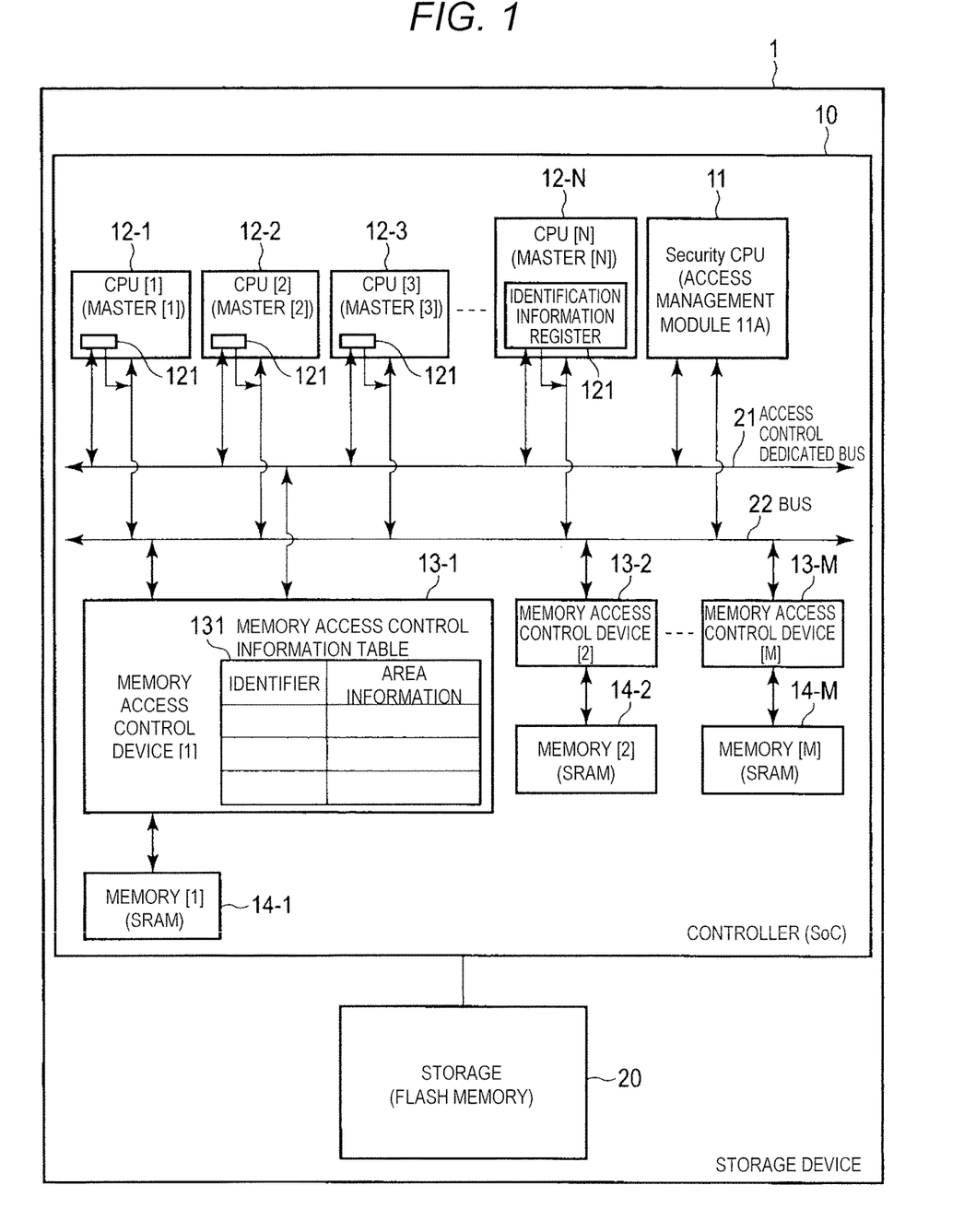
FIG. 1 is a diagram illustrating a configuration example of a storage device according to a first embodiment.

FIG. 1 is a diagram illustrating a configuration example of a storage device 1 according to the present embodiment. The storage device 1 receives a command from a host coupled via an interface such as PCIe (registered trademark), executes a process corresponding to the command, and transmits a process result to the host. The command received by the storage device 1 includes a write command which requests data write, a read command which requests data read, or the like.

The storage device 1 includes a controller 10 configured with, for example, an SoC (system on a chip) and a storage 20 which is a flash memory, for example.

The controller 10 has a plurality of CPUs (11, 12-1, 12-2, ..., 12-N) including a Security CPU 11. An access means to information stored in the Security CPU 11 is restricted, and reliability of the information is guaranteed. The Security CPU 11 is a CPU having higher security strength than general CPUs (12-1, 12-2, . . . , 12-N). The Security CPU 11 is a CPU in which operation safety is secured, and can function as, for example, Roots of Trust. Hereinafter, the general CPUs 12-1, 12-2, . . . , 12-N may be collectively referred to as a CPU 12. Here, it is assumed that the Security CPU 11 executes an access management module 11A, which is one program stored in the storage 20, for example. The access management module 11A will be described later. Hereinafter, operation or the like of the Security CPU 11 based on the access management module 11A may be described using the access management module 11A as a subject.

On the other hand, it is assumed that the CPU 12 executes firmware stored in the storage 20, for example. This firmware is a program indicating a processing procedure such as writing data to the storage 20 and reading data from the storage 20. The CPU 12 has an identification information register 121. The identification information register 121 will also be described later.

Further, the controller 10 includes a plurality of memory access control devices (13-1, 13-2, . . . , 13-M) and a plurality of memories (14-1, 14-2, . . . , 14-M) which are SRAMs, for example. Hereinafter, the memory access control devices 13-1, 13-2, . . . , 13-M may be collectively referred to as the memory access control device 13, and the memory 14-1, 14-2, . . . , 14-M may be collectively referred to as a memory 14. The memory 14 is used by the CPU 12 as a cache or a work area. That is, the controller 10 executes an operation to write data to a storage 20 and an operation to read data from the storage 20 while using the memory 14 which is an internal memory as a temporary storage area of data. The memory 14 may be provided outside the controller 10 and coupled to a bus 22 via the memory access control device 13.

The memory access control device 13 is a device provided in one-to-one correspondence with the memory 14 in order to control access to the memory 14 from the CPU 12. For this control, the memory access control device 13 stores a memory access control information table 131 in a register or the like. The memory access control information table 131 is set by the access management module 11A. The memory access control device 13 may be configured with an electronic circuit, or may include a processor and a memory and implemented by the processor executing the program stored in the memory.

Furthermore, the controller 10 has two buses, which are access control dedicated bus 21 and bus 22, as buses which couple the Security CPU 11, the CPU 12, and the memory access control device 13 to each other. The access control dedicated bus 21 is a bus dedicated for the access management module 11A to set the memory access control information table 131 in the memory access control device 13. Further, the access control dedicated bus 21 is a bus dedicated for the access management module 11A to store an identifier, which is included in the memory access control information table 131 and which is set for controlling access to the memory 14, in the identification information register 121 of the CPU 12. For the access control dedicated bus 21, only the Security CPU 11 can operate as a bus master. The identification information register 121 of the CPU 12 can be accessed only via the access control dedicated bus 21, and the memory access control information table 131 in the memory access control device 13 can be accessed only via the access control dedicated bus 21. That is, access to the identification information register 121 of the CPU 12 is restricted only to the access management module 11A, and access to the memory access control information table 131 in the memory access control device 13 is also restricted only to the access management module 11A.

On the other hand, the bus 22 is a bus for the CPU 12 to access the memory 14. The memory 14 is coupled to the bus 22 via the memory access control device 13. In other words, the memory access control device 13 is interposed between the bus 22 and the memory 14. For the bus 22, the Security CPU 11 and the CPU 12 can operate as a bus master. That is, the Security CPU 11 can also access the memory 14 via the memory access control device 13 using the bus 22.

Thus, the storage device 1 has the access control dedicated bus 21 in addition to the general bus 22. Further, the storage device 1 has the access management module 11A which accesses the CPU 12 and the memory access control device 13 via the access control dedicated bus 21.

It is assumed that, for example, the memory 14-1 is divided into two areas (an area A and an area B), the area A is assigned to the CPU 12-1 and the CPU 12-2, and the area B is assigned to the CPU 12-3. In other words, it is assumed that access to the area A is limited only to the CPU 12-1 and the CPU 12-2, and access to the area B is limited only to the CPU 12-3.

Figure 2:
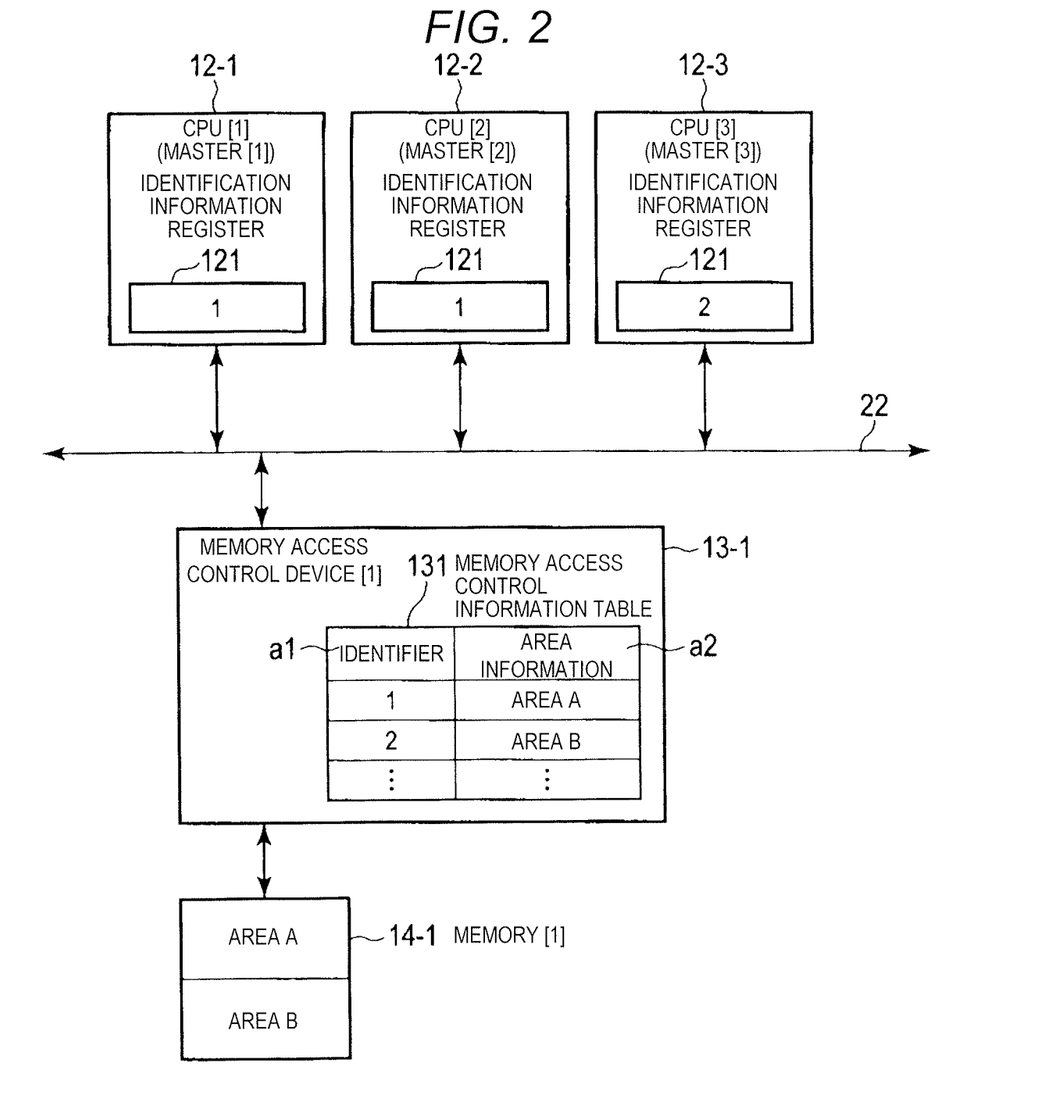
FIG. 2 is a diagram illustrating a setting example of management information in the storage device of the first embodiment.

In this case, the access management module 11A sets the memory access control information table 131 in the memory access control device 13-1 corresponding to the memory 14-1 via the access control dedicated bus 21 as illustrated in FIG. 2. Also the access management module 11A sets values of the identification information registers 121 of the CPU 12-1, 12-2, and 12-3 respectively, via the access control dedicated bus 21 as shown in FIG. 2.

The memory access control information table 131 has an identifier field a1 and an area information field a2. The access management module 11A stores an identifier used for accessing the area A in the identifier field a1 of one entry in the memory access control information table 131, which is allocated for the area A. Further, the access management module 11A stores an identifier used for accessing the area B in the identifier field a1 of one entry in the memory access control information table 131, which is allocated for the area B. Here, the identifier used for accessing the area A is set to 1, and the identifier used for accessing the area B is set to 2.

Further, the access management module 11A stores area information indicating a range of the area A on the memory 14-1 in the area information field a2 of the one entry in the memory access control information table 131, which is allocated for the area A. The access management module 11A stores area information indicating a range of the area B on the memory 14-1 in the area information field a2 of the one entry in the memory access control information table 131, which is allocated for the area B. The area information is, for example, a start address and an end address.

Then, the access management module 11A stores the identifier (1) used for accessing the area A in the identification information register 121 of the CPU 12-1 and the CPU 12-2, and stores the identifier (2) used for accessing the area B in the identification information register 121 of the CPU 12-3.

As described above, setting the memory access control information table 131 in the memory access control device 13 and setting the value of the identification information register 121 of the CPU 12 can be performed only via the access control dedicated bus 21. That is, it is limited only to the access management module 11A which can operate as a bus master of the access control dedicated bus 21. Therefore, unauthorized rewriting of management information such as the values of the memory access control information table 131 in the memory access control device 13 and the identification information register 121 of the CPU 12 is prevented.

When the CPU 12-1 accesses the area A of the memory 14-1, for example, the CPU 12-1 outputs the identifier stored in the identification information register 121 to the bus 22 in addition to control information requesting access to the memory 14-1. The control information is information called a command, for example, and includes information whether data is written or read, that is, information indicating an access type and address information on the memory targeted by the access. Further, the control information includes information indicating the memory 14-1, that is, information designating one memory 14 of the plurality of memory 14.

In a case of AMBA AXI bus, for example, a channel capable of transferring user information such as AWUSER, ARUSER, WUSER, RUSER is defined separately from a channel for data transfer. If the AMBA AXI bus is applied as the bus 22, an identifier can be output in addition to the control information.

When the control information requesting access to the memory 14-1 is output to the bus 22, the memory access control device 13-1 collates the address information included in the control information with the memory access control information table 131, and recognizes access to the area A. Further, in addition to the control information, the memory access control device 13-1 compares an identifier output to the bus 22 with the identifier stored in the memory access control information table 131, and determines whether the access is permissible. Here, since "1" is stored in the identification information register 121 of the CPU 12-1, the access is permitted. When access is permitted, the memory access control device 13-1 transfers the control information to the memory 14-1. Then, the memory access control device 13-1 outputs information transferred from the memory 14-1 to the bus 22 according to the control information.

As for the Security CPU 11, for example, a special identifier may be provided and used to perform access to the memory 14 so that access to any area of any memory 14 is permitted, or access may be permitted only to areas not set in the memory access control information table 131. The area which is not set in the memory access control information table 131 is an area which is not assigned to any CPU 12.

Since "1" is also stored in the identification information register 121 of the CPU 12-2, access to the area A of the memory 14-1 by the CPU 12-2 is permitted. On the other hand, since "2" instead of "1" is stored in the identification information register 121 of the CPU 12-3, access to the area A of the memory 14-1 by the CPU 12-3 is not permitted. When the access is denied, the memory access control device 13-1 outputs information indicating an error to the bus 22.

Conversely, the CPU 12-3 in which "2" is stored in the identification information register 121 is permitted to access the area B of the memory 14-1, but the CPU 12-1 and the CPU 12-2 in which "1" instead of "2" is stored in the identification information register 121 are denied to access the area B of the memory 14-1.

In the storage device 1, the identification information register of the CPU 12-3 and the memory access control information table 131 in the memory access control device 13 can be rewritten only via the access control dedicated bus 21. Therefore, for example, an unauthorized action such as unauthorized access from the CPU 12-3 to the area A by rewriting the values of, such as, the identification information register of the CPU 12-3 (from "2" to "1"), the identifier field a1 of the area A in the memory access control information table 131 (from "1" to "2"), or the area information field a2 of the area B in the memory access control information table 131 so as to include the range of the area A, can be prevented.

Here, an example is shown in which one entry in the memory access control information table 131 is allocated for the area A of the memory 14-1, and the identifier stored in the identifier field a1 matches with the identification information register 121 of the CPU 12-1 and the identification information register 121 of the CPU 12-2, so that the CPU 12-1 and the CPU 12-2 can access the area A of the memory 14-1. Instead, for example, two entries in the memory access control information table 131 may be allocated for the area A of the memory 14-1, an identifier used by the CPU 12-1 may be stored in one identifier field a1, and an identifier used by the CPU 12-2 may be stored in the other identifier field a1, so that the CPU 12-1 and the CPU 12-2 can access the area A of the memory 14-1. In this case, the same information, that is, the area information indicating the range of the area A on the memory 14-1 is stored in the area information field a2 of both entries.

Figure 3:
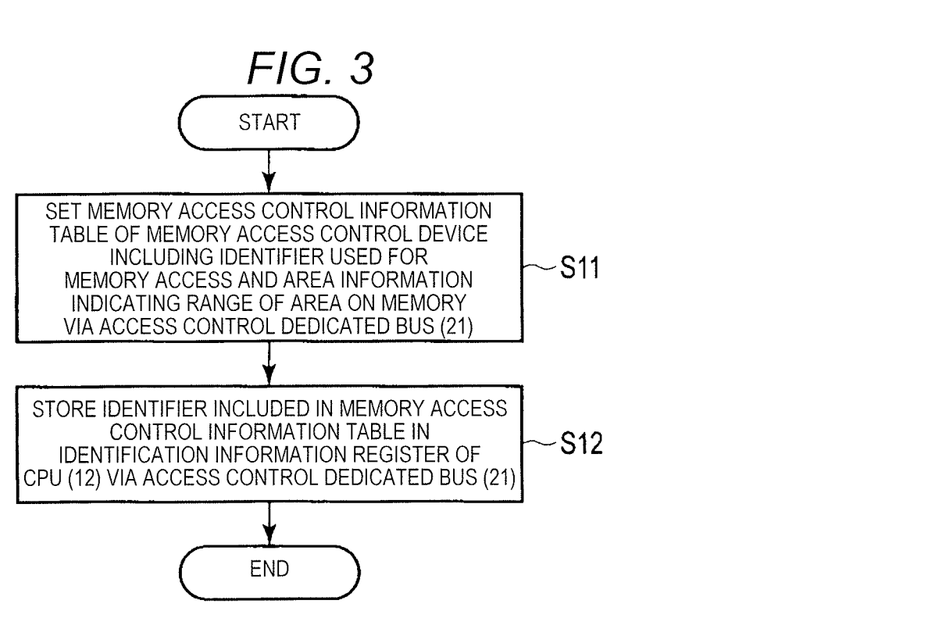
FIG. 3 is a flowchart illustrating an operating procedure of an access management module in the storage device of the first embodiment.

FIG. 3 is a flowchart showing an operating procedure of the access management module 11A.

The access management module 11A sets the memory access control information table 131 of the memory access control device 13 including an identifier used for memory access and area information indicating a range of an area on the memory via the access control dedicated bus 21 (S11).

Further, the access management module 11A stores the identifier included in the memory access control information table 131 into the identification information register 121 of the CPU 12 via the access control dedicated bus 21 (S12).

Figure 4:
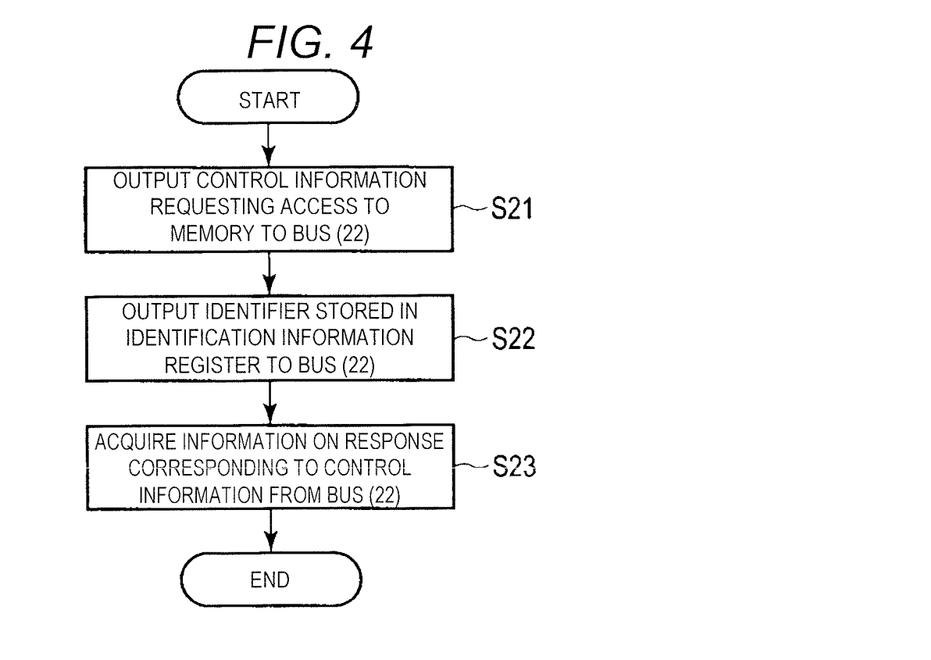
FIG. 4 is a flowchart illustrating an operating procedure of a bus master when accessing memory in the storage device of the first embodiment.

FIG. 4 is a flowchart illustrating an operating procedure of the CPU 12 which executes firmware, which is a program defining a processing procedure such as writing data to the storage 20 and reading data from the storage 20, and operates as a bus master of the bus 22 for accessing the memory 14.

When accessing the memory 14, the CPU 12 outputs control information requesting access to the memory to the bus 22 (S21), and in addition to the control information, the CPU 12 outputs the identifier stored in the identification information register 121 to the bus 22 (S22). The CPU 12 acquires information on a response corresponding to the control information from the bus 22 (S23).

Figure 5:
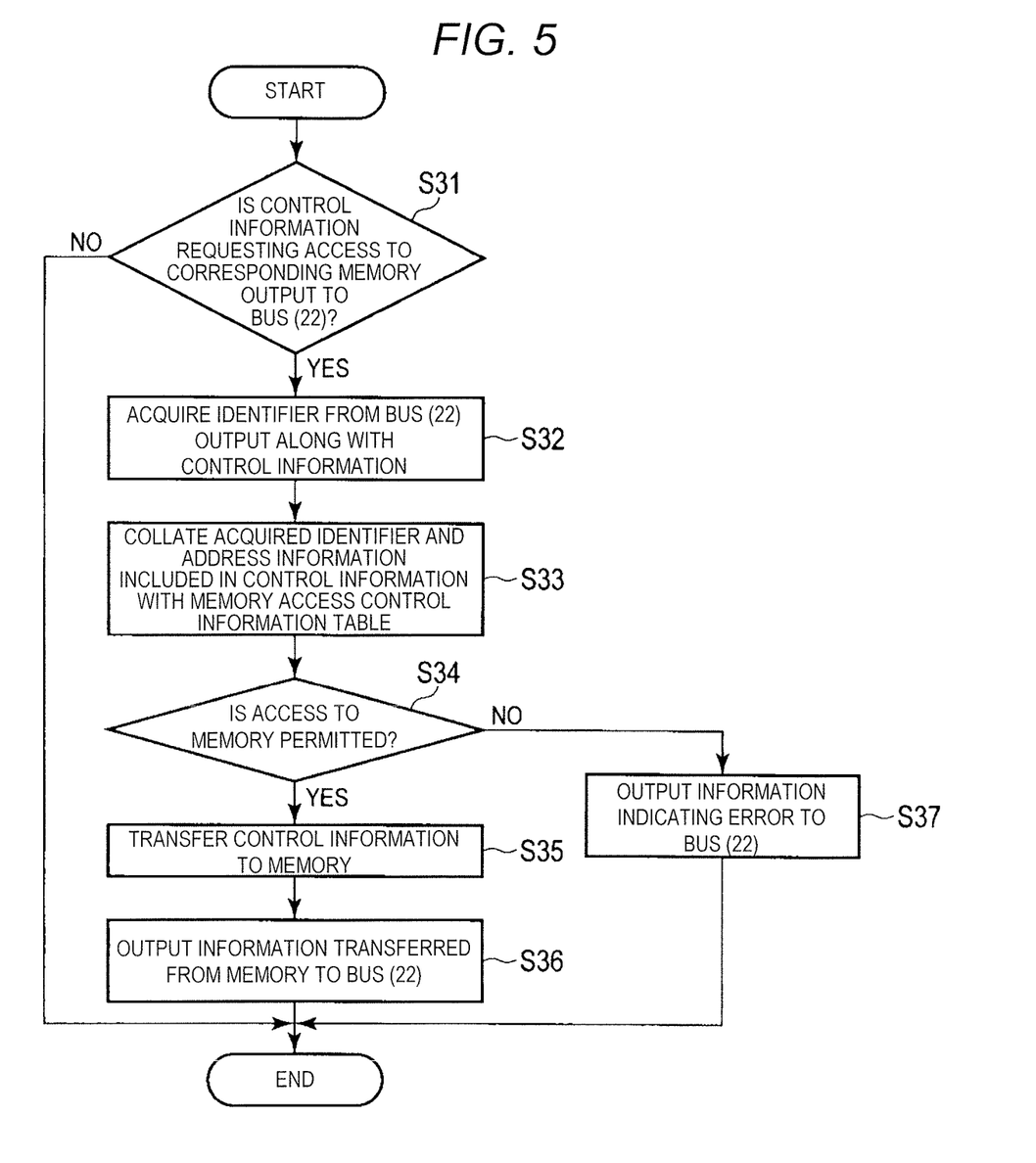
FIG. 5 is a flowchart illustrating an operating procedure of a memory access control device in the storage device of the first embodiment.

FIG. 5 is a flowchart illustrating an operating procedure of the memory access control device 13.

The memory access control device 13 monitors whether control information requesting access to the corresponding memory 14 is output to the bus 22 (S31). When it is output (S31: YES), since the CPU 12 which outputs the control information also outputs an identifier to the bus 22 along with the control information, the memory access control device 13 acquires the identifier from the bus 22 (S32).

The memory access control device 13 collates the acquired identifier and the access area included in the control information with the memory access control information table 131 (S33). As a result of the collation, when it is determined that access to the memory 14 is permitted (S34: YES), the memory access control device 13 transfers the control information output to the bus 22 to the memory 14 (S35). If the identifier which is permitted to access the area of the memory 14 corresponding to the access area included in the control information matches the acquired identifier, it is determined that the access to the memory 14 is permitted. Then, the memory access control device 13 outputs information transferred from the memory 14 to the bus 22 in response to the control information (S36).

On the other hand, when it is determined that access to the memory 14 is denied (S34: NO), the memory access control device 13 outputs information indicating an error to the bus 22 (S37).

As described above, since the storage device 1 includes the access management module 11A and the access control dedicated bus 21 and access to the management information such as the value of the memory access control information table 131 in the memory access control device 13 and the identification information register 121 of the CPU 12 is limited to access via the access control dedicated bus 21 in which only the access management module 11A can operate as the bus master, it is possible to prevent unauthorized rewriting of the management information.

A method of controlling access to the memory for each bus master described here is not limited to control of access to memory 14 by the CPU 12 in the controller 10 of the storage device 1 and it can be applied to general control of access to the memory by a plurality of bus masters in the system in which the plurality of bus masters access the memory via the bus.

Second Embodiment

Next, a second embodiment will be described. Here, the same configuration elements as those in the first embodiment are denoted by the same reference numerals, and redundant description thereof is omitted.

Figure 6:
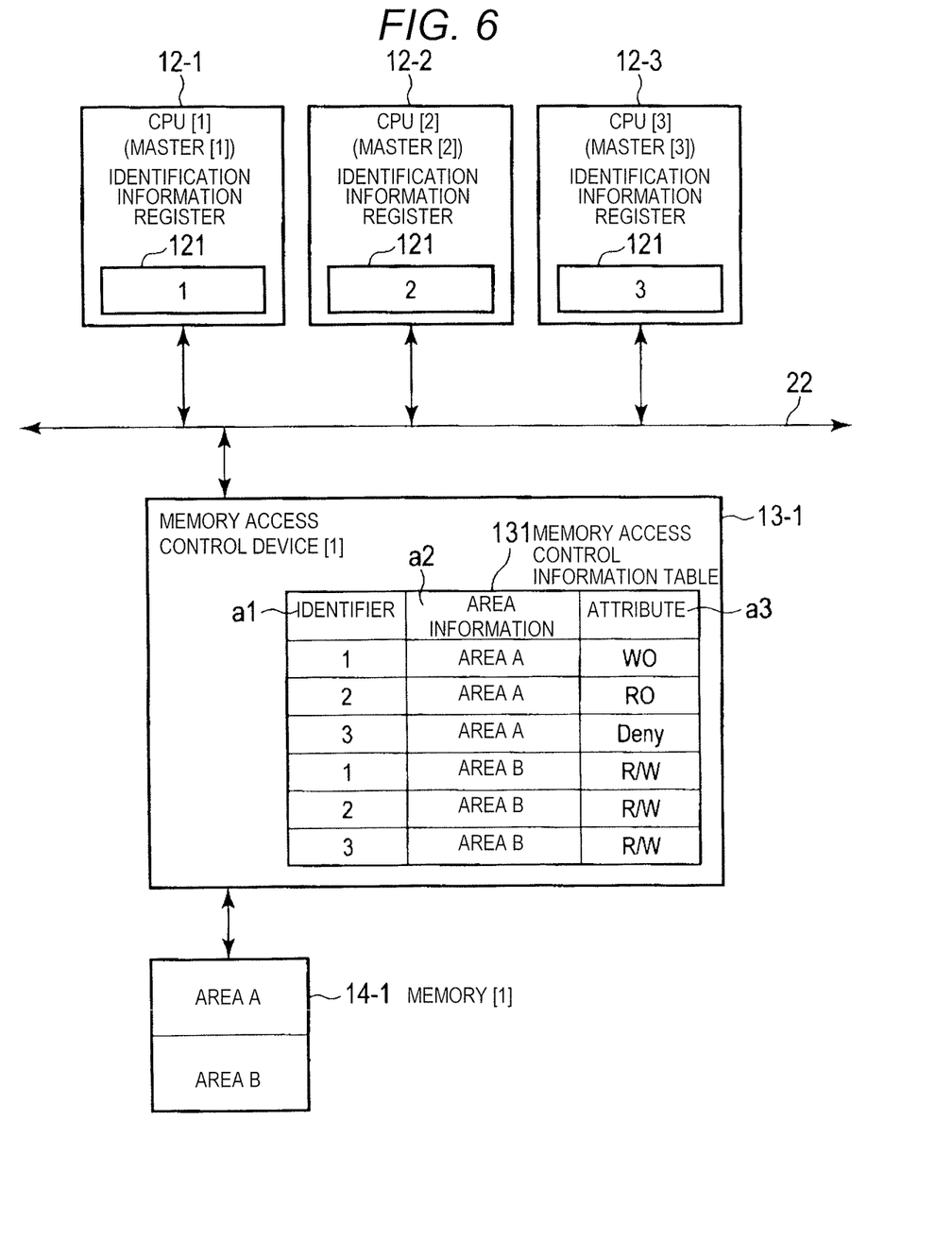
FIG. 6 is a diagram illustrating a setting example of management information in the storage device of the second embodiment.

The storage device 1 of the present embodiment is related to the storage device 1 having a configuration to prevent unauthorized rewriting of the management information for controlling access to the memory for each bus master described in the first embodiment, and each bus master is further controlled for a type of access such as write only permission (WO), read only permission (RO), access deny (Deny), and write and read permission (RW). Therefore, in the storage device 1 of the present embodiment, as illustrated in FIG. 6, the memory access control information table 131 in the memory access control device 13 further has an attribute field a3 storing information indicating a type of access (WO, RO, Deny, and RW). In the storage device 1 of the present embodiment, the access management module 11A sets an appropriate value in the attribute field a3, and the memory access control device 13 determines whether access to the memory 14 by the CPU 12 is permitted and further controls the type of access for each bus master, based on the memory access control information table 131 including the attribute field a3.

FIG. 6 illustrates a setting example of the memory access control information table 131 and the identification information register 121 when access to the area A and the area B on the memory 14-1 is controlled as follows for each of the CPUs 12-1, 12-2, and 12-3.

CPU 12-1 Area A: Write only permission, Area B: Both write and read permission, CPU 12-2 Area A: Read only permission, Area B: Both write and read permission, CPU 12-3 Area A: Access deny, Area B: Both write and read permission The access management module 11A assigns, for example, "1" as an identifier for the CPU 12-1, "2" as an identifier for the CPU 12-2, and "3" as an identifier for the CPU 12-3 to the area A and the area B, respectively. The access management module 11A allocates three entries in the memory access control information table 131 for the area A, corresponding to the CPU 12-1, CPU 12-2, and CPU 12-3, and allocates three entries in the memory access control information table 131 for the area B corresponding to the CPU 12-1, the CPU 12-2 and CPU 12-3. Then, the access management module 11A stores three identifiers assigned to each of the area A and the area B for the CPU 12-1, the CPU 12-2, and the CPU 12-3, in the identifier field a1 of the six entries with each three being allocated for the area A and the area B, and stores a value indicating write only permission, read only permission, access deny, both write and read permission, or the like in the attribute field a3. More specifically, the access management module 11A stores three identifiers the value indicating a type of access as illustrated in FIG. 6 so that access to the area A and the area B on the memory 14-1 is controlled as described above.

Here, it is assumed that the control information which is output from the CPU 12 to the bus 22 and which requests access to the memory 14 includes information indicating a type of the access. The memory access control device 13 in the storage device 1 of the present embodiment further collates the information indicating the type of the access with the memory access control information table 131 to determine whether access to the memory 14 is permissible.

For example, when the CPU 12-1 outputs, to the bus 22, control information requesting writing data to the area A of the memory 14-1, the memory access control device 13-1 corresponding to the memory 14-1 approves the access. On the other hand, when the CPU 12-1 outputs, to the bus 22, control information requesting reading data from the area A, the memory access control device 13-1 denies the access. In other words, regarding the access to the area A of the memory 14-1 by the CPU 12-1, the storage device 1 controls access to the same area according to a type of access (e.g., permitting write of data, and denying read of data).

Further, also in the storage device 1 which controls the type of access for each bus master, the attribute field a3 of the memory access control information table 131 in the memory access control device 13 can be rewritten only via the access control dedicated bus 21 in which only the access management module 11A can operate as the bus master, so that it is possible to prevent unauthorized rewriting of the management information as in the first embodiment.

A method of controlling access to the memory for each bus master described here is also not limited to the control of the access to memory 14 by the CPU 12 in the controller 10 of the storage device 1 and it can be applied to general control of the access to the memory by a plurality of bus masters in a system in which the plurality of bus masters access the memory via a bus.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
   a storage; and
   a controller configured to control data write to the storage and data read from the storage,
   wherein the controller includes
   a first processor;

a second processor including a register;
a first bus configured for the second processor to access a memory that is configured for use by the second processor as a cache or a work area;
a memory access control device configured to:
manage a memory access control information table, the memory access control information table storing access control information including information indicating a range of each of a plurality of areas of the memory and an identifier associated with each area, and
control, on the basis of the memory access control information table, access to the memory by the second processor using the first bus; and
a second bus configured for the first processor to access the second processor and the memory access control device, wherein among the first processor, the second processor, and the memory access control device, only the first processor is configured as a bus master of the second bus,
wherein the first processor has a first security strength higher than a second security strength of the second processor,
wherein the first processor is configured to:
set the memory access control information table via the second bus, a setting of the memory access control information table being performed only by the first processor via the second bus; and
set an identifier to the second processor in the register of the second processor, the set identifier being among the identifiers stored in the memory access control information table and corresponding to a range of an area of the memory to which the second processor is permitted to access, a setting of the identifier in the register of the second processor being performed only by the first processor via the second bus,
wherein the second processor is configured to output the identifier to the first bus together with control information requesting access to the memory when accessing the memory, and
wherein the memory access control device is configured to compare the identifier output to the first bus with the identifier stored in the memory access control information table, and determine whether to allow the access to the memory requested by the second processor.

2. The storage device according to claim 1, wherein the memory access control device is configured to determine an area of the memory to be accessed by the second processor on the basis of address information included in the control information.

3. The storage device according to claim 2, wherein the access control information further includes information indicating a type of access permitted for each area, and
the memory access control device is further configured to compare information indicating a type of access included in the control information with the information indicating the type of access permitted for the are included in the access control information, and determine whether to allow the access to the memory requested by the second processor.

4. The storage device according to claim 1, wherein the memory is provided in the controller.

5. The storage device according to claim 1, wherein the information indicating the range of the area includes a start address and an end address of the area.

6. A memory access control system comprising:
a memory;
a first bus;
a plurality of first bus masters each including a register and being configured to access the memory using the first bus;
a memory access control device configured to:
manage a memory access control information table that stores access control information including information indicating a range of each of a plurality of areas of the memory and an identifier associated with each area, and
control access to the memory by the plurality of first bus masters using the first bus on the basis of the memory access control information table;
an access management device configured to set the memory access control information table and set an identifier to at least one of the plurality of first bus masters in the register of the at least one of the plurality of first bus masters, the identifier being among the identifiers stored in the memory access control information table and corresponding to a range of an area of the memory to which at least one of the plurality of first bus masters is permitted to access, wherein among the plurality of first bus masters, the memory access control device, and the access management device, only the access management device is configured as a bus master of the second bus, wherein a setting of the memory access control information table is performed only by the access management device via the second bus, and wherein storing of the identifier in the register of the at least one of the plurality of first bus masters is performed only by the access management device via the second bus; and
a second bus configured for the access management device to access the plurality of first bus masters and the memory access control device,
wherein one of the plurality of first bus masters is configured to output the identifier set by the access management device to the first bus together with control information requesting access to the memory when accessing the memory, and
wherein the memory access control device is configured to compare the identifier output to the first bus with the identifier stored in the memory access control information table, and determine whether to allow the access to the memory requested by one of the plurality of first bus masters.

7. The memory access control system according to claim 6, wherein the information indicating the range of the area includes a start address and an end address of the area.

8. A memory access control method of controlling access to a memory via a first bus in a storage device; the storage device including the first bus, a second bus, a first processor, and the memory; only the first processor being capable of operating as a bus master of the second bus, the method comprising:
setting, to a memory access control information table by the first processor using the second bus, access control information including information indicating a range of each of a plurality of areas on the memory and an identifier associated with each area;
setting an identifier corresponding to a range of an area of the memory, to which a bus master is permitted to access via the first bus among the identifiers included in the access control information, to the bus master by the first processor using the second bus;

in response to the identifier being output from the bus master to the first bus together with control information requesting access to the memory; and comparing the identifier output to the first bus with the identifiers stored in the access control information to determine whether the access to the memory via the first bus requested by the bus master is available.

9. The memory access control method according to claim 8, wherein the information indicating the range of the area includes a start address and an end address of the area.

* * * * *